US012699433B2

(12) United States Patent
Sun

(10) Patent No.: US 12,699,433 B2
(45) Date of Patent: Aug. 4, 2026

(54) POWER SUPPLY CIRCUIT

(71) Applicant: SUZHOU METABRAIN INTELLIGENT TECHNOLOGY CO., LTD., Suzhou (CN)

(72) Inventor: Hui Sun, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/470,761

(22) PCT Filed: May 27, 2024

(86) PCT No.: PCT/CN2024/095604
§ 371 (c)(1),
(2) Date: Sep. 29, 2025

(87) PCT Pub. No.: WO2025/166947
PCT Pub. Date: Aug. 14, 2025

(65) Prior Publication Data
US 2026/0118936 A1 Apr. 30, 2026

(30) Foreign Application Priority Data
Feb. 5, 2024 (CN) .......................... 202410166572.0

(51) Int. Cl.
*G06F 1/30* (2006.01)
*H02J 1/08* (2026.01)
(52) U.S. Cl.
CPC ................ *G06F 1/30* (2013.01); *H02J 1/086* (2020.01)

(58) Field of Classification Search
CPC .................................. G06F 1/30; H02J 1/086
See application file for complete search history.

(56) References Cited

U.S. PATENT DOCUMENTS

2019/0121413 A1 4/2019 Tsai et al.

FOREIGN PATENT DOCUMENTS

CN 204144917 U 2/2015
CN 107731260 A 2/2018
(Continued)

*Primary Examiner* — Bryce P Bonzo
*Assistant Examiner* — Audrey Emma Whitesell
(74) *Attorney, Agent, or Firm* — IPro, PLLC

(57) ABSTRACT

The present application provides a power supply circuit. When a power supply input by a server is abnormal, a first voltage conversion module inputs a low-level voltage to a gate of a second MOS transistor, and the second MOS transistor is turned on. At this time, a second voltage input by an external mobile power supply may be input to the second MOS transistor through an interface module, and the second MOS transistor divides the second voltage to obtain a third voltage and inputs the third voltage to the second voltage conversion module. The second voltage conversion module may convert the third voltage into a fourth voltage to supply power to a baseboard management controller, so that the baseboard management controller in the server has a working power supply temporarily by using the external mobile power supply to reversely supply power to the baseboard management controller, so that the backstage personnel may continue to obtain log information in the baseboard management controller, quickly understand reasons for the abnormal power supply of the server, realize rapid positioning of abnormal problems, and provide convenience for users.

20 Claims, 3 Drawing Sheets

(56) References Cited

FOREIGN PATENT DOCUMENTS

| | | | | | |
|---|---|---|---|---|---|
| CN | 207910546 | U | * | 9/2018 | |
| CN | 209786868 | U | | 12/2019 | |
| CN | 112445313 | A | | 3/2021 | |
| CN | 215772542 | U | | 2/2022 | |
| CN | 116719399 | A | * | 9/2023 | ............ G06F 1/266 |
| CN | 117707318 | A | | 3/2024 | |
| KR | 102510108 | B1 | | 3/2023 | |

* cited by examiner

POWER SUPPLY CIRCUIT

CROSS-REFERENCE TO RELATED APPLICATION

The present application claims the priority of Chinese patent application filed in CNIPA on Feb. 5, 2024, with the application number of 202410166572.0 and the application name of "A POWER SUPPLY CIRCUIT", the entire contents of which are incorporated into the present application by reference.

FIELD

The present application relates to the field of computers, in particular to a power supply circuit.

BACKGROUND

At present, the electronic information industry is developing in a direction of digitalization and intelligence, especially a data center of server, and the realization of the digitalization and intelligence function of a server still depends on stable and normal power supply;

In the related art, when a power supply of the server is abnormal, it is necessary to remove a board from the server and repair it. This process involves soldering flying wires to supply power from an external source to a baseboard management controller chip and digital chips on the faulty board. This method is time-consuming and labor-consuming. Additionally, backstage personnel are unable to promptly identify a cause of the board anomaly. Moreover, a process of soldering flying wires may cause secondary damage to the board, which can interfere with the collection of anomaly logs.

SUMMARY

In view of the above problems, the embodiments of the present application are proposed to provide a power supply circuit that overcomes or at least partially solves the above problems.

In order to resolve the above problems, the present application discloses a power supply circuit, including a first voltage conversion module, a first MOS transistor, a second voltage conversion module, a second metal-oxide-semiconductor field-effect transistor (MOSFET, MOS transistor for short), a baseboard management controller and an interface module; wherein, an output end of the first voltage conversion module is respectively connected to an input end of the first MOS transistor and a gate of the second MOS transistor, and an input end of the first voltage conversion module is connected to a gate of the first MOS transistor, and the first voltage conversion module is configured to output a first voltage to the gate of the first MOS transistor and the gate of the second MOS transistor when an input power supply is abnormal; the first voltage is a low-level voltage;

an output end of the first MOS transistor is respectively connected to an input end of the second voltage conversion module and an output end of the second MOS transistor, and the first MOS transistor is configured to turn off when it is detected that the input power supply is abnormal;

the interface module is connected to an input end of the second MOS transistor, and is configured to input a second voltage input by an external mobile power supply to the second MOS transistor, wherein the second voltage is a high-level voltage;

the second MOS transistor is configured to turn on when the first voltage is detected, and input a third voltage obtained by dividing the second voltage into the second voltage conversion module;

the output end of the second voltage conversion module is connected to the baseboard management controller, and the second voltage conversion module is configured to convert the third voltage into a fourth voltage to supply power to the baseboard management controller.

In some embodiments, the power supply circuit further includes: a power supply protection module, a complex programmable logic device; an input end of the power supply protection module is respectively connected to the output end of the first MOS transistor and the output end of the second MOS transistor, an output end of the power supply protection module is connected to the interface module and the input end of the second MOS transistor, an input end of the complex programmable logic device is connected to an indicator pin of power supply of the first voltage conversion module, and an output end of the complex programmable logic device is connected to an enable pin of the power supply protection module, the complex programmable logic device is configured to output a low-level general purpose input/output signal to the power supply protection module when a low-level signal is detected, and the power supply protection module is configured to turn off when the low-level general purpose input/output signal is received.

In some embodiments, the first voltage conversion module is configured to convert a fifth voltage input by the input power supply into a sixth voltage when the input power supply is normal, and input the sixth voltage to the gate of the first MOS transistor and the gate of the second MOS transistor respectively, and input a high-level signal to the complex programmable logic device, wherein the sixth voltage is a high-level voltage.

In some embodiments, the complex programmable logic device is configured to output a high-level general purpose input/output signal to the enable pin of the power supply protection module when the high-level signal is detected.

In some embodiments, the first MOS transistor is further configured to divide the sixth voltage to obtain a seventh voltage, and input the seventh voltage to the second voltage conversion module and the power supply protection module respectively.

In some embodiments, the second MOS transistor is further configured to turn off when the sixth voltage output by the first voltage conversion module is detected.

In some embodiments, the power supply protection module is further configured to turn on when the high-level general purpose input/output signal is detected, and convert the seventh voltage into an eighth voltage and input the eighth voltage to the interface module to charge the external mobile power supply.

In some embodiments, the power supply circuit further includes a first resistor, one end of the first resistor is connected to the gate of the first MOS transistor, and the other end of the first resistor is connected to the input end of the first voltage conversion module.

In some embodiments, the power supply circuit further includes a second resistor and a third resistor, wherein one end of the second resistor is connected to the input end of the second voltage conversion module, the other end of the second resistor is connected to one end of the third resistor and an enable pin of the second voltage conversion module respectively, and the other end of the third resistor is grounded.

In some embodiments, the power supply circuit further includes a fourth resistor and a fifth resistor, one end of the fourth resistor is connected to the output end of the first MOS transistor, the other end of the fourth resistor is respectively connected to the enable pin of the power supply protection module, one end of the fifth resistor and the output end of the complex programmable logic device, and the other end of the fifth resistor is grounded.

In some embodiments, the power supply circuit further includes a sixth resistor, one end of the sixth resistor is connected to the gate of the second MOS transistor, and the other end of the sixth resistor is connected to the output end of the first voltage conversion module.

In some embodiments, the power supply circuit further includes a diode, one end of the diode is connected to the interface module, and the other end of the diode is grounded.

In some embodiments, the power supply circuit further includes a third voltage conversion module and a deployment device, an input end of the third voltage conversion module is connected to the output end of the first MOS transistor, and an output end of the third voltage conversion module is connected to the deployment device.

In some embodiments, the power supply circuit further includes a seventh resistor and an eighth resistor, one end of the seventh resistor is connected to the input end of the third voltage conversion module, the other end of the seventh resistor is respectively connected to an enable pin of the third voltage conversion module and one end of the eighth resistor, and the other end of the eighth resistor is grounded.

In some embodiments, the first MOS transistor is an N-type MOS transistor and the second MOS transistor is a P-type MOS transistor.

In some embodiments, converting the third voltage into a fourth voltage to supply power to the baseboard management controller includes:

converting the third voltage into the fourth voltage, and inputting the fourth voltage into the baseboard management controller to supply power to the baseboard management controller, wherein the third voltage is 10V and the fourth voltage is 3.8V.

In some embodiments, a gate voltage of the second MOS transistor is zero, and the second MOS transistor is turned on.

In some embodiments, turning off when the sixth voltage output by the first voltage conversion module is detected includes:

turning off the gate of the second MOS transistor when detecting that the sixth voltage output by the first voltage conversion module is a high-level voltage.

In some embodiments, the diode is configured to absorb a reverse current generated at the interface module when the input power supply is cut off.

In some embodiments, the interface module includes USB or Type C.

The embodiments of that application include the following advantage:

The present application discloses a power supply circuit. When the power supply input by a server is abnormal, the first voltage conversion module inputs a low-level voltage to the gate of the second MOS transistor, and the second MOS transistor is turned on. At this time, the second voltage input by the external mobile power supply may be input to the second MOS transistor through the interface module, and the second MOS transistor divides the second voltage to obtain a third voltage and inputs the third voltage to the second voltage conversion module. The second voltage conversion module may convert the third voltage into a fourth voltage to supply power to the baseboard management controller, so that the baseboard management controller in the server has a working power supply temporarily by using the external mobile power supply to reversely supply power to the baseboard management controller, so that the backstage personnel may continue to obtain log information in the baseboard management controller, quickly understand reasons for the abnormal power supply of the server, realize rapid positioning of abnormal problems, and provide convenience for users.

DETAILED DESCRIPTION

In order to make the above objects, features and advantages of the present application more obvious and easy to understand, the present application will be further described in detail with the attached drawings and specific embodiments.

At present, the electronic information industry is developing in a direction of digitalization and intelligence, especially a data center of server. The realization of digitalization and intelligence functions needs to rely on various sensors and digital chips in a server to collect and transmit information, in order that backstage personnel may obtain internal running status and log information of the server more intuitively, and conduct business deployment and problem handling in time.

However, the realization of digitalization and intelligence functions still depend on stable and normal power supply of a system: the sensors and digital chips for collecting information, baseboard management controllers for control and management, and network chips for data transmission need to be powered normally. The baseboard management controllers may include baseboard management controller chips.

When the power supply of the system is abnormal, the sensor, digital chip or baseboard management controller can't get the power supply that can support stable work. At this time, the backstage personnel can't get any information of the server, and a network of the server is completely interrupted, so a connection can't be realized. Even if the digital chip or baseboard management controller inside the server has the black box log function, a reason for the abnormal power supply of the server can't be obtained because of the abnormal power supply.

In the related art, when the power supply of the server is abnormal, the server may only be taken off a shelf for maintenance and the abnormal board may be repaired. If there is a need to access the log information when the server is abnormal, the server must be repowered. However, in most cases, the abnormal power supply of the server is caused by the damage of internal devices, and the server can hardly be powered on normally again.

Figure 1:
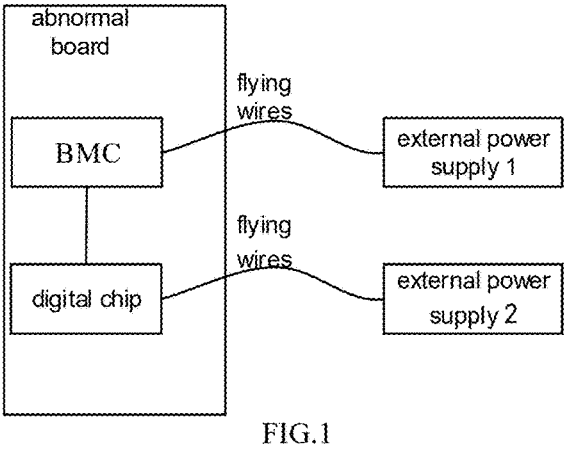
FIG. 1 is a schematic diagram of a power supply of the related art provided by an embodiment of the present application.

As shown in FIG. 1, a schematic diagram of a power supply of the related art provided by an embodiment of the present application is shown. In the figure, an external power supply 1 is configured to supply power to a baseboard management controller on an abnormal board and an external power supply 2 is configured to supply power to a digital chip on the abnormal board using a method of soldering flying wires. However, this method is time-consuming and labor-consuming. Additionally, backstage personnel are unable to promptly identify a cause of the board anomaly. Moreover, a process of soldering flying wires may cause secondary damage to the board, which may interfere with the collection of anomaly logs.

One of the core ideas of the embodiment of the present application is that when the power supply of an input power of the server is abnormal, a first voltage conversion module inputs a low-level voltage to a gate of a second MOS transistor, and the second MOS transistor is turned on. At this time, a second voltage input from an external mobile power supply may be input to the second MOS transistor through an interface module, and the second MOS transistor divides the second voltage to obtain a third voltage and inputs it to a second voltage conversion module. The second voltage conversion module may convert the third voltage into a fourth voltage to supply power to a baseboard management controller, in order that the baseboard management controller in the server has a working power supply temporarily by using the external mobile power supply to reversely supply power to the baseboard management controller, so that the backstage personnel may continue to obtain log information in the baseboard management controller, quickly understand reasons for an abnormal power supply of the server, realize rapid positioning of abnormal problems, and provide convenience for users. The voltage conversion modules are electronic circuit components designed to convert input power voltage into different voltage levels required by devices.

Figure 2:
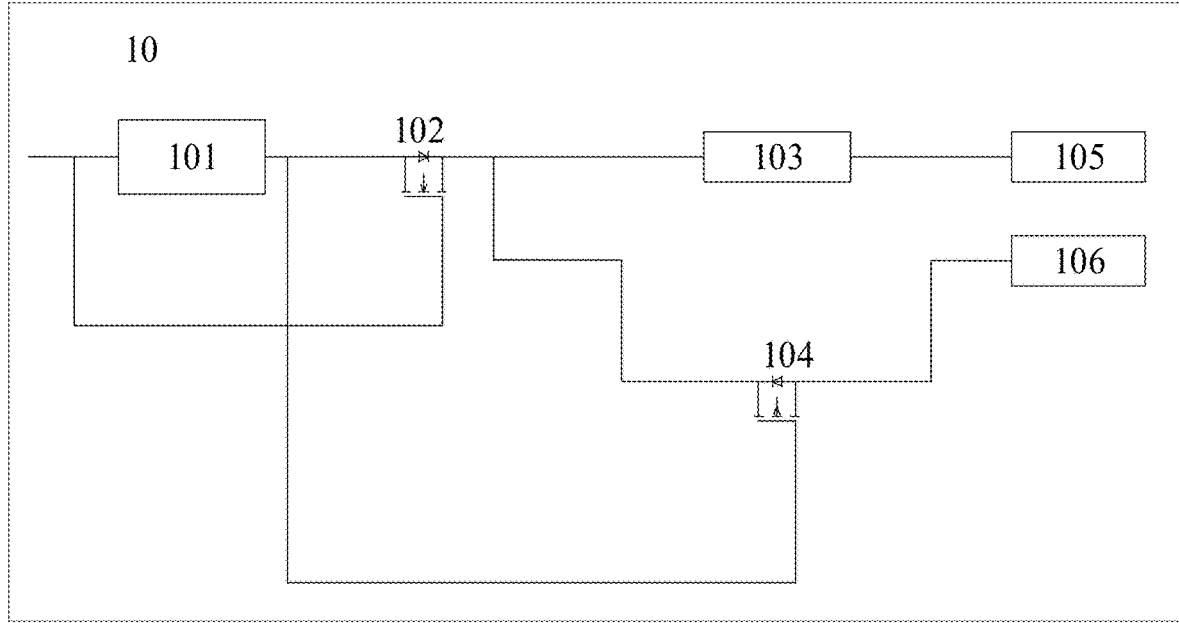
FIG. 2 is a structural block diagram of a power supply circuit provided by an embodiment of the present application.

Referring to FIG. 2, a structural block diagram of a power supply circuit 10 provided by an embodiment of the present application is shown. The power supply circuit 10 includes a first voltage conversion module 101, a first MOS transistor 102, a second voltage conversion module 103, a second MOS transistor 104, a baseboard management controller 105 and an interface module 106.

An output end of the first voltage conversion module 101 is respectively connected to an input end of the first MOS transistor 102 and a gate of the second MOS transistor 104, and an input end of the first voltage conversion module 101 is connected to a gate of the first MOS transistor 102. The first voltage conversion module 101 is configured to output a first voltage to the gates of the first MOS transistor 102 and the second MOS transistor 104 when an input power supply is abnormal, and the first voltage is a low-level voltage.

In this embodiment, the first voltage conversion module 101 is connected to the input power supply. When the power supply of the input power supply is abnormal, an input voltage of the input power supply is zero, and the first voltage output by the first voltage conversion module 101 is also zero, that is, a low-level voltage. At this time, the output end of the first voltage conversion module 101 may output the first voltage to the gates of the first MOS transistor 102 and the second MOS transistor 104.

An output end of the first MOS transistor 102 is respectively connected to an input end of the second voltage conversion module 103 and an output end of the second MOS transistor 104, and the first MOS transistor 102 is configured to be turned off when detecting that the input power supply is abnormal.

In this embodiment, when the gate of the first MOS transistor 102 detects that the input power supply is abnormal, that is, when a voltage value of the input power supply is zero, the first MOS transistor 102 is turned off.

The interface module 106 is connected to an input end of the second MOS transistor 104, and is configured to input a second voltage input by an external mobile power supply to the second MOS transistor 104, and the second voltage is a high-level voltage.

In the embodiment of the present application, the interface module is connected to an external mobile power supply, and the external mobile power supply may input a second voltage to the second MOS transistor through the interface module.

The second MOS transistor 104 is configured to turn on when the first voltage is detected, and input a third voltage obtained by dividing the second voltage to the second voltage conversion module 103.

In this embodiment, because the gate of the second MOS transistor 104 is connected to the output end of the first voltage conversion module 101, and the second MOS transistor 104 is turned on when the voltage is at a low level, the first voltage conversion module 101 outputs a first voltage, and the first voltage is at a low level, so the second MOS transistor is turned on. At this time, the second MOS transistor may divide the second voltage input by the interface module 106 to obtain a third voltage and input the third voltage to the second voltage conversion module 103.

In some embodiments of the present application, the first MOS transistor is an N-type MOS transistor and the second MOS transistor is a P-type MOS transistor.

The output end of the second voltage conversion module 103 is connected to the baseboard management controller 105, and the second voltage conversion module 103 is configured to convert the third voltage into a fourth voltage to supply power to the baseboard management controller 105.

In the embodiment of the present application, after receiving the third voltage input from the second MOS transistor 104, the second voltage conversion module 103 may convert the third voltage into the fourth voltage, which is required for the operation of the baseboard management controller. In some examples, the third voltage is 10 v, and the required voltage for the operation of the baseboard management controller is 3.8 v. The second voltage conversion module 103 may convert 10 v into 3.8 v, and then input the 3.8V voltage to the baseboard management controller to supply power to it.

The present application discloses a power supply circuit. When the power supply input by a server is abnormal, a first voltage conversion module inputs a low-level voltage to the gate of a second MOS transistor, and the second MOS transistor is turned on. At this time, the second voltage input by an external mobile power supply may be input to the second MOS transistor through an interface module, and the second MOS transistor divides the second voltage to obtain a third voltage and inputs it to the second voltage conversion module. The second voltage conversion module may convert the third voltage into the fourth voltage to supply power to the baseboard management controller. This enables the external mobile power supply to provide reverse power supply to the baseboard management controller, temporarily restoring operational power to the controller within the server. Consequently, backstage personnel can continue to access the log information stored in the baseboard management controller, quickly identify the cause of the abnormal power supply of the server, achieve rapid fault localization, and provide users with convenience.

Figure 3:
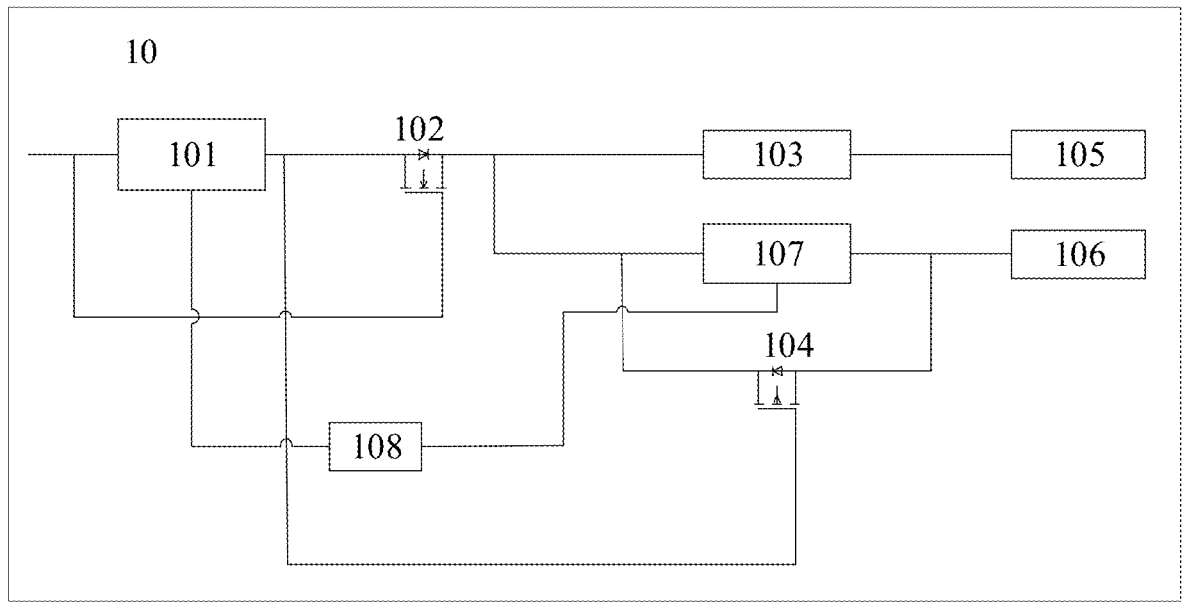
FIG. 3 is a structural block diagram of another power supply circuit provided by an embodiment of the present application.

Referring to FIG. 3, a structural block diagram of a power supply circuit 10 provided by an embodiment of the present application is shown, and the power supply circuit may further include a power supply protection module 107 and a complex programmable logic device 108, wherein an input end of the power supply protection module 107 is respectively connected to the output end of the first MOS transistor 102 and the output end of the second MOS transistor 104, and an output end of the power supply protection module 107 is connected to the input ends of the interface module 106 and the second MOS transistor 104. An input end of the complex programmable logic device 108 is connected to an indicator pin of the supply power of the first voltage conversion module 101, and an output end of the complex programmable logic device 108 is connected to an enable pin of the power supply protection module 107. The complex programmable logic device 108 is configured to output a low-level general purpose input/output signal to the power supply protection module 107 when detecting a low-level signal, and the power supply protection module 107 is configured to turn off when it receives the low-level general purpose input/output signal.

In this embodiment of the present application, when the input power supply is abnormal, the complex programmable logic device 108 detects that a signal of an indicator pin of the power supply of the first voltage conversion module is a low-level signal, and the complex programmable logic device 108 will control the output end to enter a low-resistance mode, in order that the complex programmable logic device 108 may output a low-level general purpose input/output signal to the power supply protection module 107, and the power supply protection module 107 is turned off when it detects the low-level general purpose input/output signal input by the complex programmable logic device, that is, the power supply protection module 107 does not work at this time.

Figure 4:
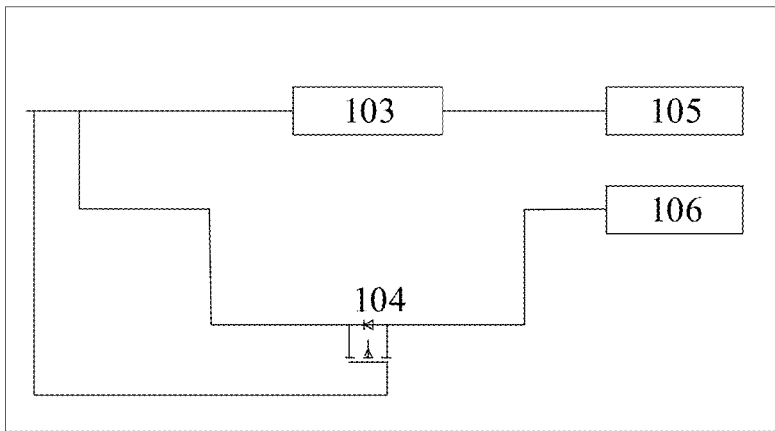
FIG. 4 is a schematic diagram of a power supply circuit when an input power supply is abnormal, provided by the embodiment of the present application.

As shown in FIG. 4, a schematic diagram of a power supply circuit when an input power supply is abnormal is shown. An external mobile power supply is introduced by the interface module 106, a gate voltage of the second MOS transistor 104 is zero, and the second MOS transistor 104 is turned on. At this time, the second voltage conversion module works normally and converts out the fourth voltage to supply power to loads of the baseboard management controller.

In some embodiments of the present application, the first voltage conversion module 101 is also configured to convert the fifth voltage input by the input power supply into a sixth voltage when the input power supply is normal, and input the sixth voltage to the gate of the first MOS transistor and the gate of the second MOS transistor respectively, and input a high-level signal to the complex programmable logic device, and the sixth voltage is a high-level voltage.

In this embodiment of the present application, as shown in FIG. 3, the first voltage conversion module 101 is also configured to convert the fifth voltage input by the input power supply into a sixth voltage when the input power supply is normal, and then input the sixth voltage to the input end of the first MOS transistor 102 and the gate of the second MOS transistor 104 respectively. As the first voltage conversion module 101 works normally at this time, the indicator pin of the power supply of the first voltage conversion module 101 may input a high-level signal to the complex programmable logic device 108 at this time.

In some embodiments of the present application, the complex programmable logic device 108 is configured to output a high-level general purpose input/output signal to an enable pin of the power supply protection module 107 when a high-level signal is detected.

In the embodiment of the present application, when the complex programmable logic device 108 detects a high-level signal input from the indicator pin of the power supply of the first voltage conversion module 101, it may output a high-level general purpose input/output signal to the enable pin of the power supply protection module 107, in order that the enable pin of the power supply protection module 107 may work normally when it detects the high-level general purpose input/output signal.

In some embodiments of the present application, the first MOS transistor is also configured to divide the sixth voltage to obtain a seventh voltage, and input it to the second voltage conversion module 103 and the power supply protection module 107 respectively.

In the embodiment of the present application, after receiving the sixth voltage, the first MOS transistor 102 may divide the sixth voltage to obtain the seventh voltage, and input it to the second voltage conversion module 103 and the power supply protection module 107 respectively.

In some embodiments of the present application, the second MOS transistor is also configured to turn off when the sixth voltage output by the first voltage conversion module is detected.

In some embodiments of the present application, the power supply protection module is also configured to turn on when a high-level general purpose input/output signal is detected, and convert the seventh voltage into an eighth voltage and input it to the interface module to charge the external mobile power supply.

In this embodiment, because the sixth voltage output by the first voltage conversion module 101 is a high-level voltage, the gate of the second MOS transistor 104 is turned off after detecting the sixth voltage, that is, 104 does not work, and the power supply protection module 107 is turned on when detecting the high-level general purpose input/output signal. At this time, the power supply protection module 107 may convert the seventh voltage into the eighth voltage and input it to the interface module 106, thus charging the external mobile power supply connected to the interface module 106.

Figure 5:
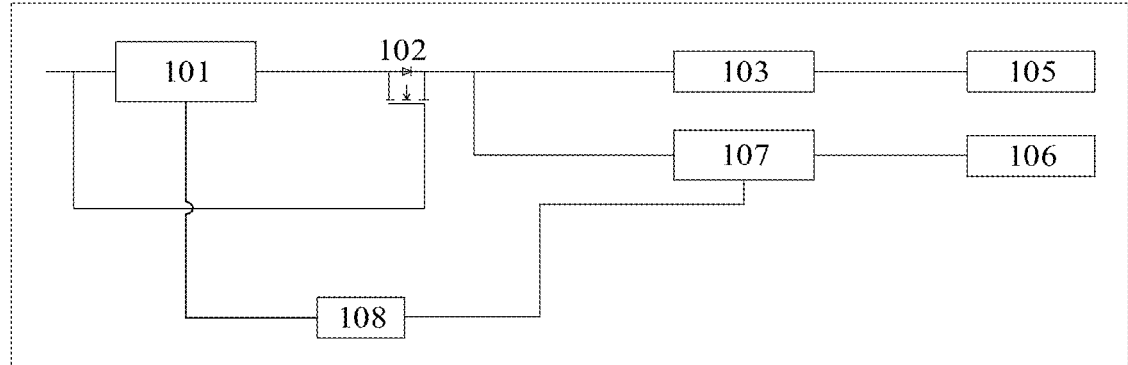
FIG. 5 is a schematic diagram of a power supply circuit when an input power supply is normal, provided by an embodiment of the present application.

As shown in FIG. 5, a schematic diagram of a power supply circuit when an input power supply is normal provided by an embodiment of the present application is shown. The fifth voltage output by the input power supply is normal, the first voltage conversion module 101 works normally, and the sixth voltage is obtained by converting, and the high-level signal is fed back to the complex programmable logic device 108. The complex programmable logic device 108 may input the high-level general purpose input/output signal to the enable pin of the power supply protection module 107. The power supply protection module 107 works normally after detecting the high-level general purpose input/output signal. The gate of the first MOS transistor 102 is turned on when detecting the high-level voltage, and the sixth voltage is converted into the seventh voltage through the first MOS transistor. The second voltage conversion module works normally and may convert and obtain the eighth voltage to supply power to the loads such as the baseboard management controller. The power supply protection module 107 may also supply power to the external mobile power supply connected to the interface module 106.

In some embodiments of the present application, the power supply circuit further includes a first resistor, wherein one end of the first resistor is connected to the gate of the first MOS transistor, and the other end of the first resistor is connected to the input end of the first voltage conversion module.

Figure 6:
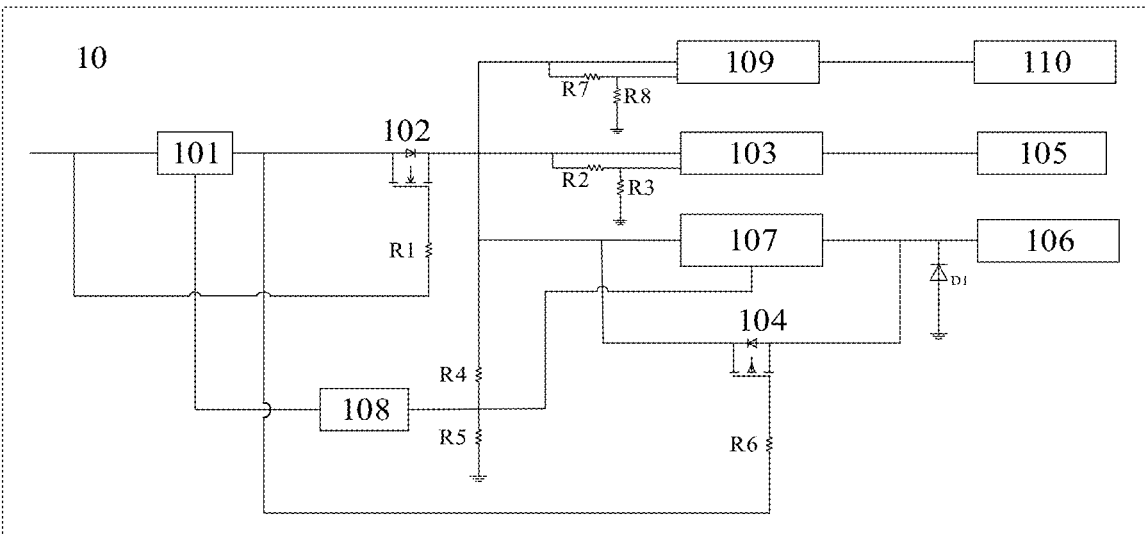
FIG. 6 is a structural block diagram of another power supply circuit provided by an embodiment of the present application.

As shown in FIG. 6, a structure block diagram of another power supply circuit provided by an embodiment of the present application is shown. The power supply circuit 10 may further include a first resistor R1, one end of which is connected to the gate of the first MOS transistor 102, and the other end of which is connected to the input end of the first voltage conversion module 101, so as to shunt a current and avoid damage to the first MOS transistor 102 caused by excessive current input to the first MOS transistor 102.

In some embodiments of the present application, the power supply circuit further includes a second resistor and a third resistor, wherein one end of the second resistor is connected to the input end of the second voltage conversion module, the other end of the second resistor is respectively connected to one end of the third resistor and the enable pin of the second voltage conversion module, and the other end of the third resistor is grounded.

In the embodiment of the present application, as shown in FIG. 6, the power supply circuit 10 may further include a second resistor R2 and a third resistor R3, one end of the second resistor R2 is connected to the input end of the second voltage conversion module 103, the other end of the second resistor R2 is connected to one end of the third resistor R3 and the enable pin of the second voltage conversion module 103 respectively, and the other end of the third resistor R3 is grounded, in order that the second resistor R2 and the third resistor R3 may divide the voltage, which may prevent excessive voltage input to the second voltage conversion module 103 from causing damage to the second voltage conversion module 103.

In some embodiments of the present application, the power supply circuit further includes a fourth resistor and a fifth resistor, one end of the fourth resistor is connected to the output end of the first MOS transistor, the other end of the fourth resistor is respectively connected to the enable pin of the power supply protection module, one end of the fifth resistor and the output end of the complex programmable logic device, and the other end of the fifth resistor is grounded.

In the embodiment of the present application, as shown in FIG. 6, the power supply circuit 10 further includes a fourth resistor R4 and a fifth resistor R5, one end of the fourth resistor R4 is connected to the output end of the first MOS transistor 102, the other end of the fourth resistor R4 is respectively connected to the enable pin of the power supply protection module 107, one end of the fifth resistor R5 and the output end of the complex programmable logic device 108, and the other end of the fifth resistor R5 is grounded. In the embodiments of the present application, the fourth resistor R4 and the fifth resistor R5 may divide the output voltage of the first MOS transistor 102, thereby protecting the circuit.

In some embodiments of the present application, the power supply circuit further includes a sixth resistor, one end of the sixth resistor is connected to the gate of the second MOS transistor, and the other end of the sixth resistor is connected to the output end of the first voltage conversion module.

In the embodiment of the present application, the power supply circuit 10 further includes a sixth resistor R6, one end of the sixth resistor R6 is connected to the gate of the second MOS transistor 104, and the other end of the sixth resistor R6 is connected to the output end of the first voltage conversion module 101. The sixth resistor R6 may play a role of shunt, which may avoid the damage of the second MOS transistor 104 caused by excessive current input to the gate of the second MOS transistor 104 and affect the normal operation of the second MOS transistor 104.

In some embodiments of the present application, the power supply circuit further includes a diode, one end of the diode is connected to the interface module, and the other end of the diode is grounded.

In the embodiment of the present application, the power supply circuit may further include a diode D1, one end of the diode D1 is connected to the interface module 106, and the other end of the diode D1 is grounded. The diode D1 may absorb a reverse current, which may prevent the voltage input from the interface module 106 from becoming negative due to the reverse current generated at the interface module 106 when the input power supply is cut off.

In some embodiments of the present application, the power supply circuit further includes a third voltage conversion module and a deployment device, wherein an input end of the third voltage conversion module is connected to the output end of the first MOS transistor, and an output end of the third voltage conversion module is connected to the deployment device.

Specifically, as shown in FIG. 6, the power supply circuit may further include a third voltage conversion module 109 and a deployment device 110. When the input power supply works normally, the third voltage conversion module 109 may convert the voltage output by the first MOS transistor 102 into a target voltage to supply power to the deployment device 110. When the input power supply works abnormally, the third voltage conversion module 109 may receive the voltage input by the second MOS transistor 104 and convert the voltage input by the second MOS transistor into a target voltage to supply power to the deployment device 110. The deployment device may be other working devices deployed by the server, and the specific one is not limited here.

In some embodiments of the present application, the power supply circuit further includes a seventh resistor and an eighth resistor, one end of the seventh resistor is connected to the input end of the third voltage conversion module, the other end of the seventh resistor is respectively connected to an enable pin of the third voltage conversion module and one end of the eighth resistor, and the other end of the eighth resistor is grounded.

As shown in FIG. 6, the power supply circuit 10 may further include a seventh resistor R7 and an eighth resistor R8, and the seventh resistor R7 and the eighth resistor R8 may divide the voltage, so as to avoid damage to the third voltage conversion module 109 caused by excessive voltage input to the third voltage conversion module 109.

In some embodiments of the present application, the deployment device 110 may include one of a central processing unit and a digital chip.

In some embodiments of the present application, the interface module 106 may include one of the following: USB (Universal Serial Bus) or Type-C (a USB interface form factor standard).

In the embodiment of the present application, USB (Universal Serial Bus) is an external bus standard, which regulates connection and communication between computers and external devices. A universal serial bus interface has hot plug function, and the universal serial bus interface may connect various peripherals, such as a mouse and a keyboard. Type C is a set of symmetrical connectors. During use, it does not require identification of an interface direction as is the case with USB-A (a USB interface standard), Mini USB (Mini Universal Serial Bus, a mini USB interface), and Micro USB (Micro Universal Serial Bus, a micro USB interface). It can withstand higher power and thus support up to 100 W of power, which enables better support for fast charging and higher data throughput. The standard specification also achieves a data bandwidth of 10 Gb/s and may be used for transmission of high-definition video. The present application adapts to different external mobile power sources through USB and Type C, without the need for custom development, providing convenience for users.

The present application discloses a power supply circuit. When a power supply input by a server is abnormal, a first voltage conversion module inputs a low-level voltage to a gate of a second MOS transistor, and the second MOS transistor is turned on. At this time, a second voltage input by an external mobile power supply may be input to the second MOS transistor through an interface module, and the second MOS transistor divides the second voltage to obtain a third voltage and inputs the third voltage to the second voltage conversion module. The second voltage conversion module may convert the third voltage into a fourth voltage to supply power to a baseboard management controller, so that the baseboard management controller in the server has a working power supply temporarily by using the external mobile power supply to reversely supply power to the baseboard management controller, so that the backstage personnel may continue to obtain log information in the baseboard management controller, quickly understand reasons for the abnormal power supply of the server, realize rapid positioning of abnormal problems, and provide convenience for users.

The invention claimed is:

1. A power supply circuit, comprising a first voltage conversion module, a first metal-oxide-semiconductor field-effect transistor (MOS transistor), a second voltage conversion module, a second MOS transistor, a baseboard management controller and an interface module; wherein, an output terminal of the first voltage conversion module is respectively connected to an input terminal of the first MOS transistor and a gate of the second MOS transistor, an input terminal of the first voltage conversion module is connected to a gate of the first MOS transistor, the first voltage conversion module is configured to output a first voltage to the gate of the first MOS transistor and the gate of the second MOS transistor when an input power supply is abnormal; the first voltage is a low-level voltage;

an output terminal of the first MOS transistor is respectively connected to an input terminal of the second voltage conversion module and an output terminal of the second MOS transistor, and the first MOS transistor is configured to turn off when it is detected that the input power supply is abnormal;

the interface module is connected to an input terminal of the second MOS transistor, and the interface module is configured to input a second voltage input by an external mobile power supply to the second MOS transistor, wherein the second voltage is a high-level voltage;

the second MOS transistor is configured to turn on when the first voltage is detected, and input a third voltage obtained by dividing the second voltage into the second voltage conversion module;

an output terminal of the second voltage conversion module is connected to a baseboard management controller, and the second voltage conversion module is configured to convert the third voltage into a fourth voltage to supply power to the baseboard management controller;

further comprising a power supply protection module and a complex programmable logic device; wherein an input terminal of the power supply protection module is respectively connected to the output terminal of the first MOS transistor and the output terminal of the second MOS transistor, an output terminal of the power supply protection module is connected to the interface module and the input terminal of the second MOS transistor, an input terminal of the complex programmable logic device is connected to a power indication pin of the first voltage conversion module, and an output terminal of the complex programmable logic device is connected to an enable pin of the power supply protection module, the complex programmable logic device is configured to output a low-level general purpose input/output signal to the power supply protection module when a low-level signal is detected, and the power supply protection module is configured to turn off when the low-level general purpose input/output signal is received.

2. The power supply circuit according to claim 1, wherein the first voltage conversion module is configured to convert a fifth voltage input by the input power supply into a sixth voltage when the input power supply is normal, input the sixth voltage to the gate of the first MOS transistor and the gate of the second MOS transistor respectively, and input a high-level signal to the complex programmable logic device, wherein the sixth voltage is a high-level voltage.

3. The power supply circuit according to claim 2, wherein the complex programmable logic device is configured to output a high-level general purpose input/output signal to the enable pin of the power supply protection module when the high-level signal is detected.

4. The power supply circuit according to claim 3, wherein the first MOS transistor is further configured to divide the sixth voltage to obtain a seventh voltage, and input the seventh voltage to the second voltage conversion module and the power supply protection module respectively.

5. The power supply circuit according to claim 4, wherein the second MOS transistor is further configured to turn off when the sixth voltage output by the first voltage conversion module is detected.

6. The power supply circuit according to claim 5, wherein turning off when the sixth voltage output by the first voltage conversion module is detected comprises:

turning off when it is detected that the sixth voltage output by the first voltage conversion module is a high-level voltage, by the gate of the second MOS transistor.

7. The power supply circuit according to claim 4, wherein the power supply protection module is further configured to turn on when the high-level general purpose input/output signal is detected, convert the seventh voltage into an eighth voltage and input the eighth voltage to the interface module to charge the external mobile power supply.

8. The power supply circuit according to claim 3, wherein the complex programmable logic device is further configured to detect that a signal of the indicator pin of power supply of the first voltage conversion module is a low-level signal, and control the output terminal of the complex programmable logic device to enter a low-resistance mode.

9. The power supply circuit according to claim 1, further comprising a first resistor, wherein one end of the first resistor is connected to the gate of the first MOS transistor, and the other end of the first resistor is connected to the input terminal of the first voltage conversion module.

10. The power supply circuit according to claim 1, further comprising a second resistor and a third resistor, wherein one end of the second resistor is connected to the input terminal of the second voltage conversion module, the other end of the second resistor is connected to one end of the third resistor and an enable pin of the second voltage conversion module respectively, and the other end of the third resistor is grounded.

11. The power supply circuit according to claim 1, further comprising a fourth resistor and a fifth resistor, wherein one end of the fourth resistor is connected to the output terminal of the first MOS transistor, the other end of the fourth resistor is connected to the enable pin of the power supply protection module, one end of the fifth resistor and the output terminal of the complex programmable logic device respectively, and the other end of the fifth resistor is grounded.

12. The power supply circuit according to claim 1, further comprising a sixth resistor, wherein one end of the sixth resistor is connected to the gate of the second MOS transistor, and the other end of the sixth resistor is connected to the output terminal of the first voltage conversion module.

13. The power supply circuit according to claim 1, further comprising a diode, wherein one end of the diode is connected to the interface module, and the other end of the diode is grounded.

14. The power supply circuit according to claim 13, wherein the diode is configured to absorb a reverse current generated at the interface module when the input power supply is cut off.

15. The power supply circuit according to claim 1, further comprising a third voltage conversion module and a deployment device, wherein an input terminal of the third voltage conversion module is connected to the output terminal of the first MOS transistor, and an output terminal of the third voltage conversion module is connected to the deployment device.

16. The power supply circuit according to claim 15, further comprising a seventh resistor and an eighth resistor, wherein one end of the seventh resistor is connected to the input terminal of the third voltage conversion module, the other end of the seventh resistor is respectively connected to an enable pin of the third voltage conversion module and one end of the eighth resistor, and the other end of the eighth resistor is grounded.

17. The power supply circuit according to claim 1, wherein the first MOS transistor is an N-type MOS transistor and the second MOS transistor is a P-type MOS transistor.

18. The power supply circuit according to claim 1, in response to converting the third voltage into the fourth voltage to supply power to the baseboard management controller, the second voltage conversion module is configured to:

convert the third voltage into the fourth voltage, and inputting the fourth voltage into the baseboard management controller to supply power to the baseboard management controller, wherein the third voltage is 10V and the fourth voltage is 3.8V.

19. The power supply circuit according to claim 1, wherein a gate voltage of the second MOS transistor is zero, and the second MOS transistor is turned on.

20. The power supply circuit according to claim 1, wherein the interface module comprises a universal serial bus (USB) or Type C.

* * * * *